Feb. 20, 1934.  G. CLAUSING  1,948,258
MACHINE FOR MANUFACTURING HEELS FOR SHOES
Filed Aug. 10, 1932  5 Sheets-Sheet 1

INVENTOR.
George Clausing
BY
ATTORNEYS

Feb. 20, 1934.  G. CLAUSING  1,948,258
MACHINE FOR MANUFACTURING HEELS FOR SHOES
Filed Aug. 10, 1932   5 Sheets-Sheet 2
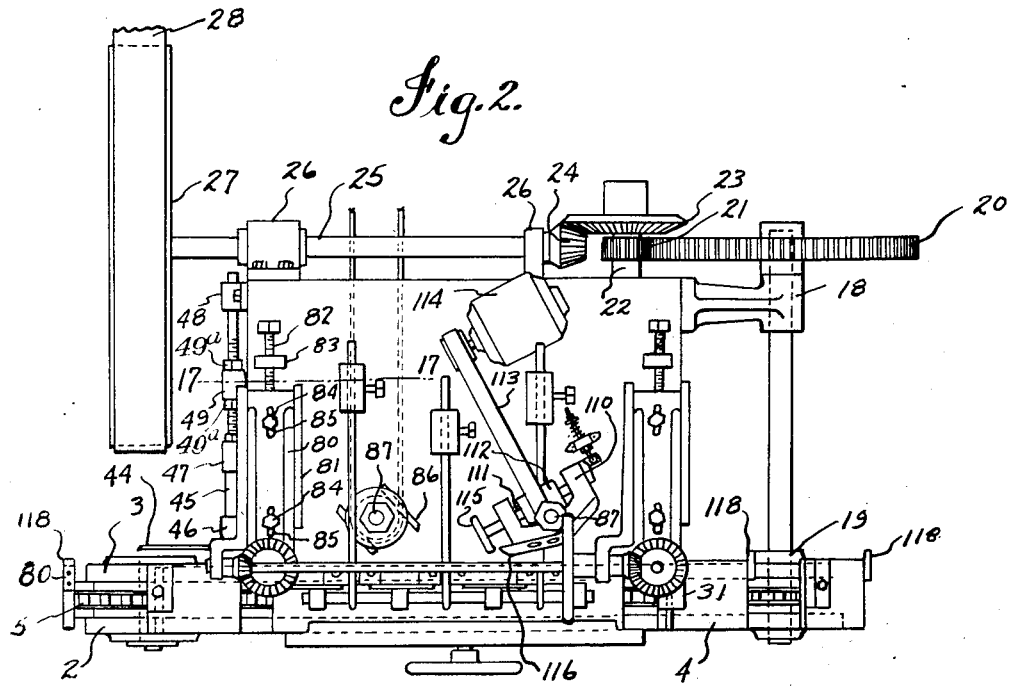
Fig. 2.
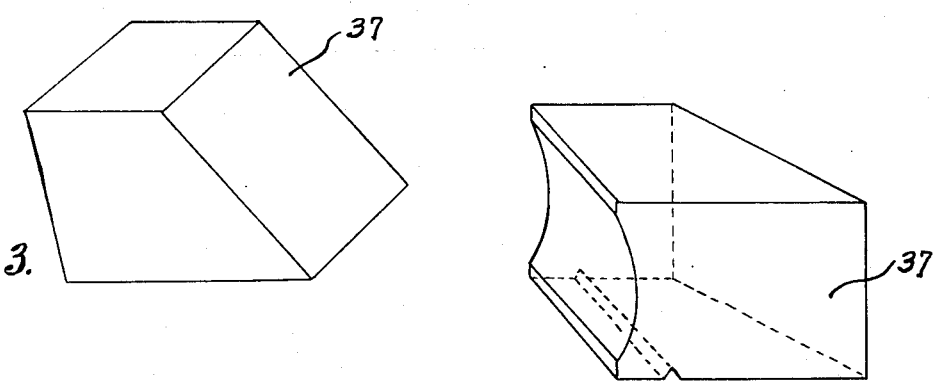
Fig. 3.
Fig. 4.
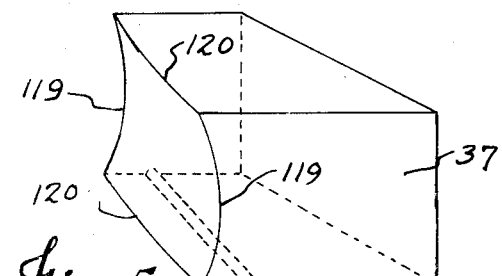
Fig. 5.
INVENTOR.
George Clausing
BY
ATTORNEYS Feb. 20, 1934.    G. CLAUSING    1,948,258
MACHINE FOR MANUFACTURING HEELS FOR SHOES
Filed Aug. 10, 1932    5 Sheets-Sheet 3

INVENTOR.
George Clausing
BY
Allen Allen
ATTORNEYS

Feb. 20, 1934.  G. CLAUSING  1,948,258
MACHINE FOR MANUFACTURING HEELS FOR SHOES
Filed Aug. 10, 1932  5 Sheets-Sheet 4
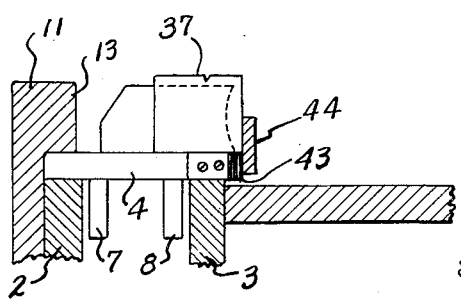
Fig.11.
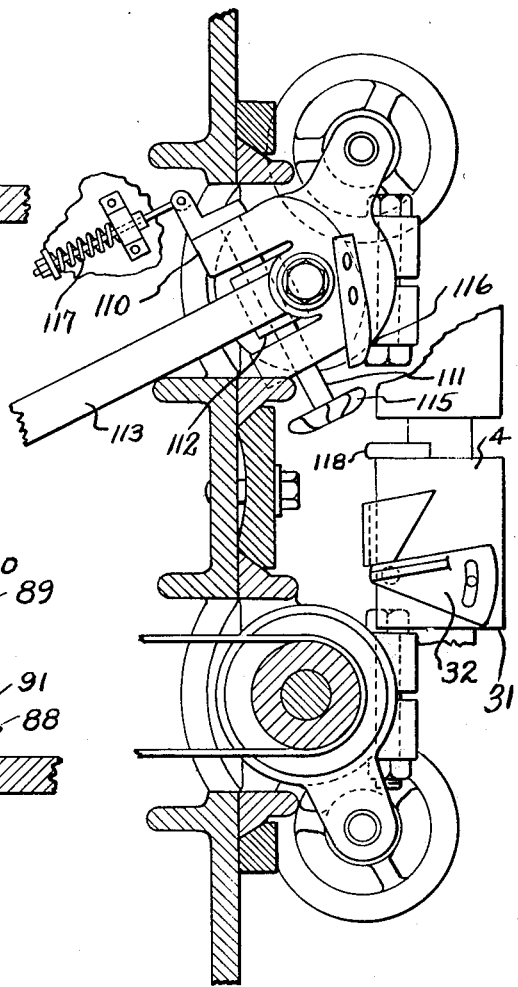
Fig.12.
Fig.14.
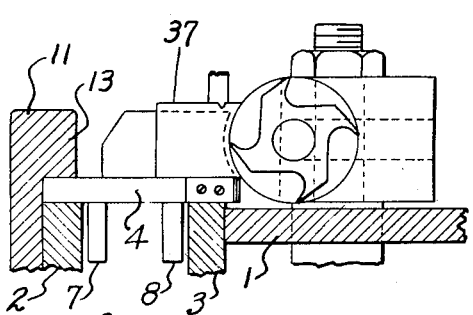
Fig.13.
INVENTOR.
George Clausing
BY
Allen & Allen
ATTORNEYS.

Feb. 20, 1934.  G. CLAUSING  1,948,258
MACHINE FOR MANUFACTURING HEELS FOR SHOES
Filed Aug. 10, 1932  5 Sheets-Sheet 5
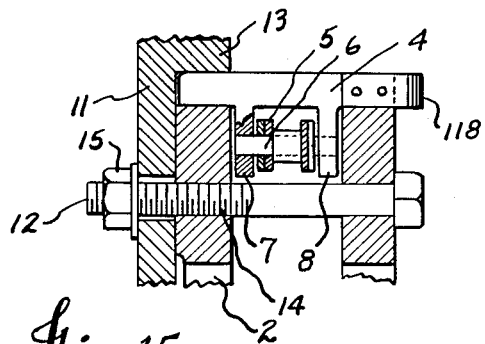
Fig.15.
Fig.16.
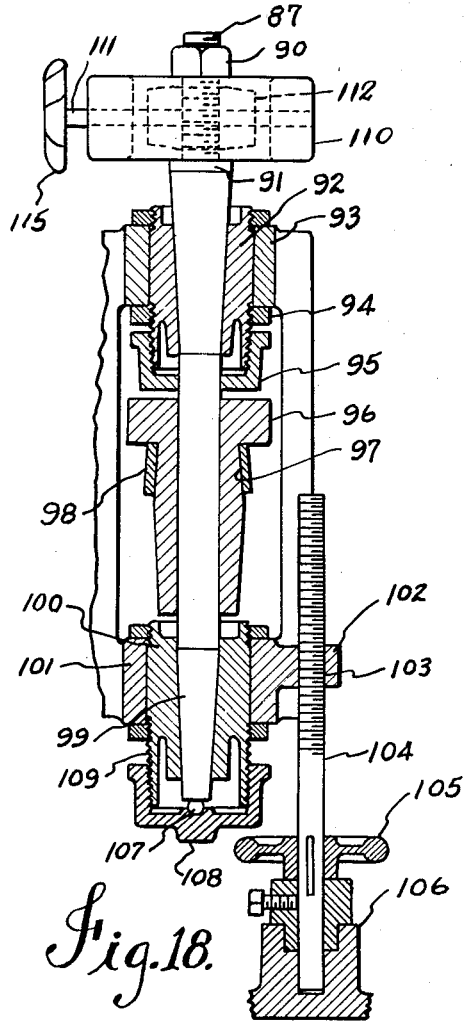
Fig.18.
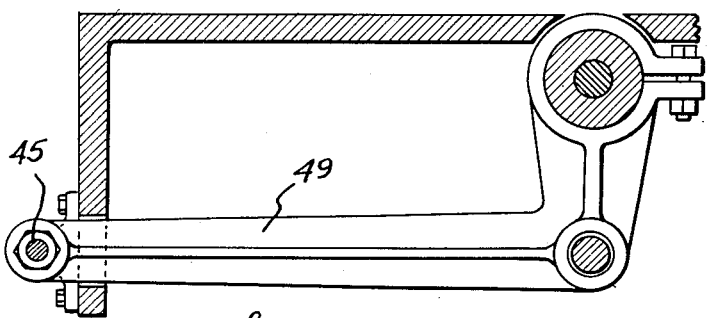
Fig.17.
INVENTOR.
George Clausing
BY
Allen Allen
ATTORNEYS Patented Feb. 20, 1934

1,948,258

UNITED STATES PATENT OFFICE 1,948,258

MACHINE FOR MANUFACTURING HEELS FOR SHOES

George Clausing, Portsmouth, Ohio, assignor to The Vulcan Corporation, Portsmouth, Ohio, a corporation of Ohio Application August 10, 1932. Serial No. 628,217

14 Claims. (Cl. 12—47.1)

My invention relates to a machine for manufacturing heels for shoes and particularly to a machine for grooving the heel breasts while the heels are moved continuously through the machine.

It is an object of my invention to provide improvements in a heel breast grooving machine, my improvements being specifically applied to the wood heel grooving machine disclosed in the C. I. Pollard United States Patent 1,669,672.

It is an object of my invention to provide a machine which will form the concave portion of the breast of a heel and at the same time cause the side edges of the breast to be straight lined.

In the art for a number of years it has been customary to provide wood heels, particularly of the Cuban type, in which the breasts of the heels are concave transversely. The usual sequence of manufacturing operations is to first concave the heel breast and to then concave the sides of the heel. Due to the fact that the planes of cross section of the two concavities are at oblique angles, unless there is some relative movement from a straight path between the heel breast and the concaving tool, the side edges of the breast will appear in curved lines. This has been considered a disadvantage from the point of view of its appearance and different methods have been suggested for concaving the breast and causing such a variation from a straight path between the cutting tool and the heel that there will be a convex line down the center of the heel longitudinally.

One old and well known method of straight lining the breast edges while concaving the breast has been to rock the heel during the interval when it is being passed by the grooving tool.

It is particularly an object of my invention to avoid rocking the heel during its presentation to the cutting tool and at the same time to avoid moving the heel in a curved path by the concaving tools. In the Pollard patent to which I have referred the heel is carried in a straight path past two sets of cutters, one of which does the roughing while the other makes the finishing cut. Since there is no relative movement between the heel and cutter longitudinally of the heel during the grooving operation the Pollard machine does not make a heel with completely straight line side breasts.

It is my object to position extensions on the lags and to arrange adjustable cams which will move the finishing cutter relatively to the heel during the grooving operation so that straight breast edges will result after the sides of the heels have also been concaved.

The above objects and other objects to which reference will be made in the ensuing description I accomplish by that certain combination and arrangement of parts of which I have illustrated a preferred embodiment.

Referring to the drawings:

Figure 2 is a plan view of the machine.

Figure 3 is a perspective view of a heel block prior to the cutting operation.

Figure 4 is a perspective view of the block after the roughing cut has been made.

Figure 5 is a perspective view of the block after the finishing cut has been made.

Figure 11 is a detailed section showing the position of the blank when it is first located upon the lag adjacent the bunter and abutting the guide.

Figure 12 is a detailed section showing the position of the knife during the initial grooving operation on the heel blank.

Figure 13 is a detailed sectional view showing the finishing grooving operation.

Figure 14 is a detailed section showing in plan the finishing cutter operation shown in Figure 13.

Figure 15 is a section showing in detail the positioning means for the chain and the lags and showing the method of adjusting the lag track.

Figure 16 is a perspective view of the pressure bar and knife edge carried by the adjustable block.

Figure 17 is an enlarged sectional view taken along the line 17—17 in Figure 2.

Figure 18 is a vertical section along the center of the cutter head spindle.

Figure 1:
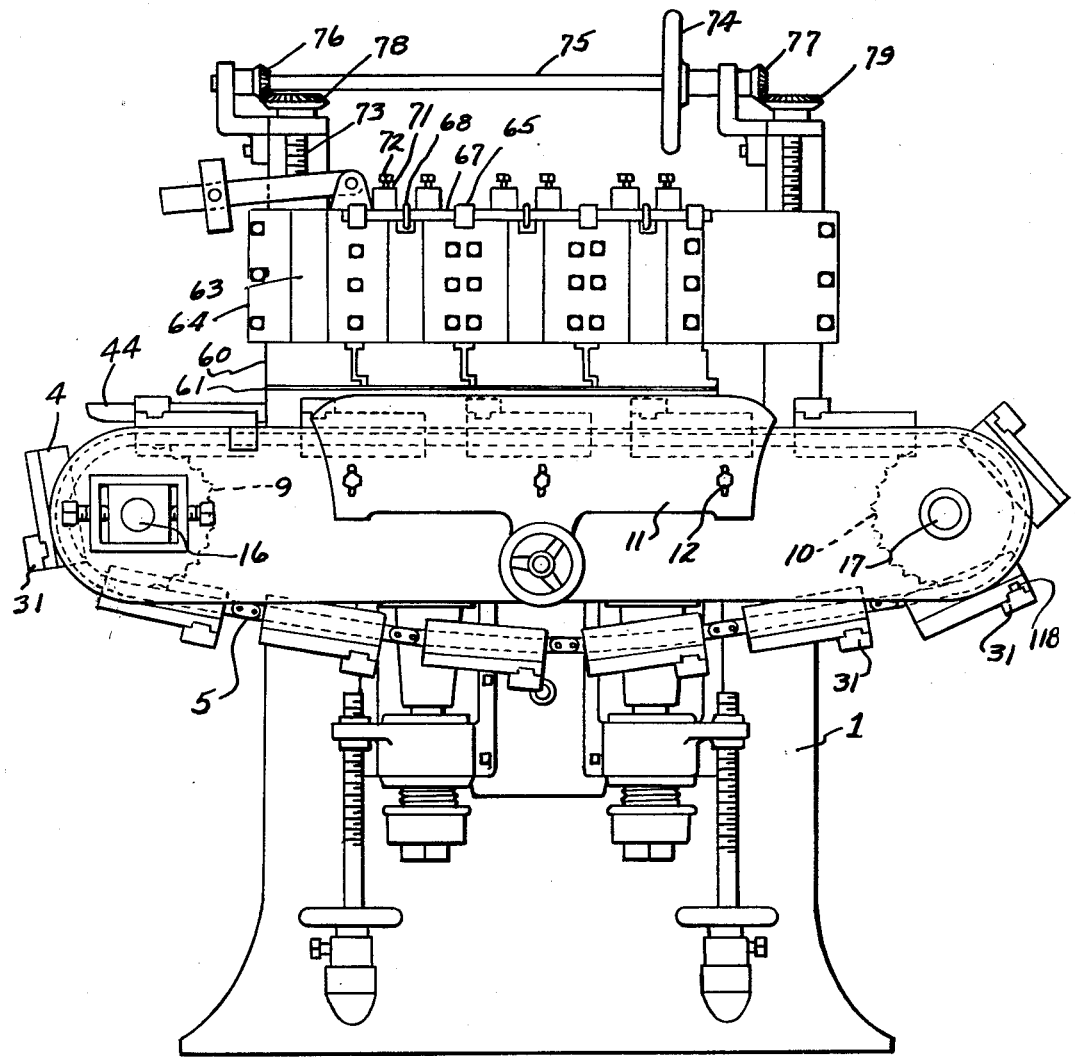
Figure 1 is a side elevation of the complete machine.

The machine is provided with a supporting frame 1 on which, as indicated in Figure 2, there are a pair of tracks 2, 3 which serve to support a series of plates known in the trade as lags and which are designated at 4 in Figure 2. These lags are mounted upon an endless chain 5 by means of a bolt 6 clearly shown in the detailed view in Figure 15. The bolts 6 are mounted in depending plates 7 and 8 which extend down from the bottom side of the lags 4. Each lag is thus pivotally mounted on its chain, and when the lags are traveling on the upper side of the chain they are supported in position by the tracks 2 and 3.

On each end of the machine on the front side there are mounted sprocket wheels 9, 10 for the purpose of driving the chain and moving the lags in succession from left to right as indicated in Figure 1. The lags pass behind and beneath a guard plate 11 which is adjustably mounted by the bolts 12 upon the surface of the frame 1 near where the operator takes his position. An overhanging shoulder 13 on the plate 11 prevents the lags from moving upwardly from the track 3. The bolt 12 preferably passes through the tracks 2 and 3. The bolt has a thread 14 which engages with the track 2 and thus serves to adjust the position of the tracks. This thread also serves to hold the nut 15 on the bolt 12 to clamp the guard plate 11.

As the tracks are fixed parts of the frame, by adjusting the bolt 12 any desired position of the guard plate 11 can be obtained which controls the travel of the lags.

The arrangement noted provides a continuously moving chain or belt having a plurality of lags upon which the blanks, which will be described later, are mounted to be operated on by the machine.

The sprocket wheels are mounted on the shafts 16, 17, the shaft 17 in this instance being the driving shaft. It is journaled in the support 18 at one end and 19 at the other. Its rear end carries a gear 20, which meshes with a pinion 21 on a stub shaft 22, which in turn carries a bevel gear 23. This bevel gear meshes with a second bevel gear or pinion 24 mounted on a shaft 25 which is located parallel to the back of the base 1. This shaft 25 is mounted in bearings 26, 26. At the outer end of the shaft 25 on the left hand side of the machine a large pulley 27 is provided to receive the driving belt 28, which is driven in turn by a pulley (not shown) which is actuated by an electric motor. Referring to the lags it will be noted that each lag 31 carries what is known in the trade as a bunter. The bunter illustrated may be either of the form shown in Figures 6 to 8 or the form shown in Figures 9 and 10 depending upon the type of groove to be imparted to the heel.

Figure 6:
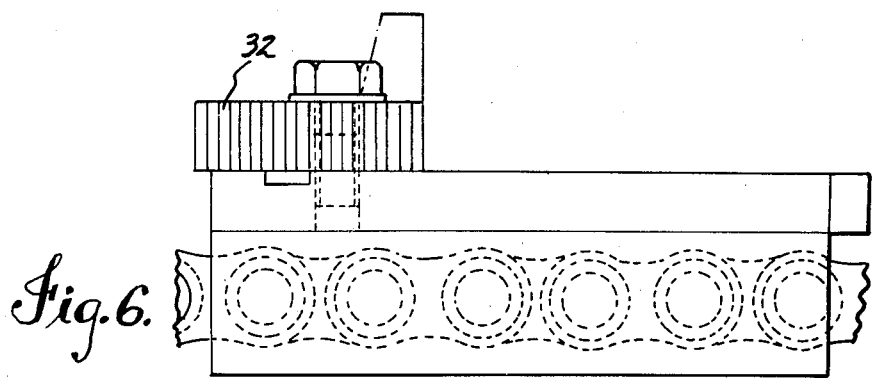
Figure 6 is a side elevation of one of the lags and bunters.
Figure 7:
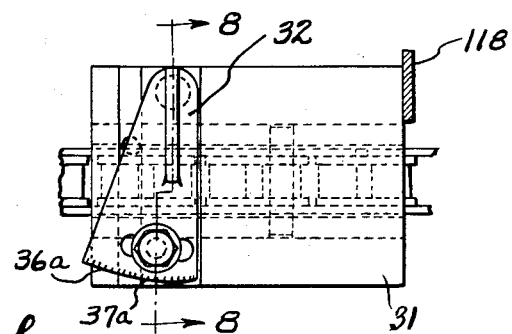
Figure 7 is a plan view of the lag and bunter shown in Figure 6.
Figure 8:
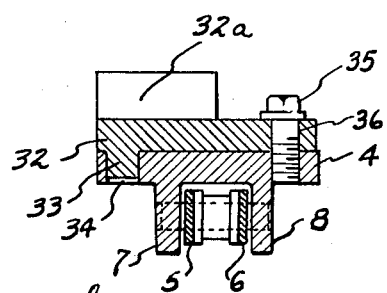
Figure 8 is a sectional view taken along the line 8—8 in Figure 7.

In the form shown in Figures 6, 7 and 8 the bunter consists of a segmental plate 32 having a downwardly projecting pin 33 fitting in the socket 34 in the lag so that it may swing about this pivot as it is adjusted in position. The set screw 35 which is located in the slot 36 in the bunter, is carried also by the lag as indicated in Figure 8. The segmental end 36a of each bunter toward the operator has a series of graduations thereon designated 37a in order to enable the operator to set all of the bunters alike, in accordance with the shape of the heel blank. The bunter has an upstanding shoulder 32a against which the heel blank abuts.

Figure 9:
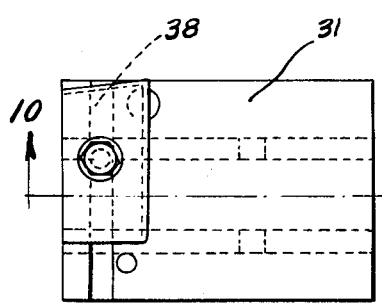
Figure 9 is a plan view of a different type of bunter.
Figure 10:
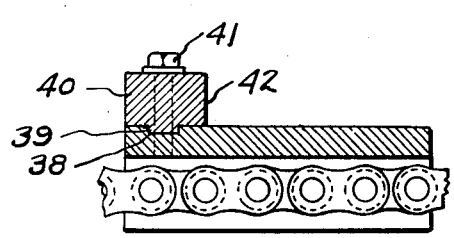
Figure 10 is a sectional view taken along the line 10—10 in Figure 9.

Considering the other type of bunter shown in Figures 9 and 10 it will be observed that the lag is provided with a transverse groove 38 in which there travels the shoulder 39 of the bunter block 40. The retaining bolt 41 which passes through the bunter block and lag serves to position and retain the bunter in place. The side of the bunter block against which the heel blank rests as at 42 is square with the lags both ways to hold the block in proper position. When the blank 37 is placed initially on the lag against the bunter it is also so positioned that its forward edge 43 abuts against the guide plate 44 so that the blanks are all positioned on the bunter in the same way. The guide is supported by a rod 45, best shown in Figure 2, the guide being carried by the head 46 of the rod 45. The rod is supported in bearings or eyes 47 and 48 on the left side of the machine. Embracing the rod is a transversely located arm 49 fixed in the frame, and nuts 49a are threaded on the rod, holding the rod and the guide in different desired backwardly and forwardly adjusted positions.

Referring to Figure 1 it will be seen that as the blank 37 is carried to the right by the conveyor it passes beneath the pressure bar 60 having a V shaped shoulder or knife edge 61 on the bottom thereof for engaging the soft wood of the blank to prevent it moving laterally. The pressure bar 60 is carried by a bolt on the bottoms of a series of blocks 63 adapted to move vertically in a guide frame 64. Mounted in this guide frame are bearings 65 supporting the shaft 67, which shaft has fixed on it a plurality of arms 68, the free end of each one of which bears down upon the top of a respective sliding block 63 to keep the pressure bar in engagement with the wooden blank 37. The arms may be weighted on their outer ends to hold them in position. Retaining lugs 71 on the guide frame 64 carry screws 72 that may be adjusted to limit the upward movement of the respective blocks 63. The whole guide frame or carrier 64 is adapted to be elevated by the vertical screws 73 at its ends, which screws are actuated by a hand wheel 74 on the cross shaft 75 which carries the bevel gears 76 and 77 meshing with bevel gears 78 and 79 on the upper ends of the screws 73.

The carrier 64 has fore and aft movement to and from the operator imparted to it by means of slides 80 which move in guideways 81 which are carried by the table. The slides themselves are actuated by the set screws 82 working in threaded openings in lugs 83 which extend up from the table. After the screws 82 have positioned the slides they are fixed in position by the bolts 84 which pass through the slots 85 in the slides 80. It will thus be noted that both vertical and fore and aft adjustment of the guideway for the blocks and pressure bars is provided.

After the blank has passed beneath the pressure bar it is in position for the first cutting operation, the result of which is shown in Figure 4. Figure 12 illustrates the blank 37 in position as it is being concaved by the rotary knife 86. The knife 86 is carried upon a vertical shaft 87 It is supported in the lower knife collar 88 and engaged on the top by the knife collar 89, which in turn is engaged by the nut 90. The lower knife collar is supported on the shoulder 91 of the shaft. This shaft tapers downwardly from the shoulder to form a bearing surface for engagement with the bearing 92 which is supported in a collar 93 mounted on a threaded washer 94. Suitable means may be provided for lubricating this bearing as desired. The lower part of the bearing is enclosed by a cup 95. A pulley is provided below this bearing on the shaft 87 comprising a top annular flange 96, below which the pulley has an upwardly tapering surface 97 which prevents the belt 98 from slipping downwardly on the pulley.

Below this pulley is the lower bearing in which the tapered portion 99 of the shaft fits. The bearing member is designated at 100 and is supported by a collar 101 carrying an arm 102, which is internally threaded at 103 for the reception of the vertical adjusting screw 104. This screw is actuated by a hand wheel 105 and is supported by the base block 106. The base of the shaft 87 rests upon a ball 107, which in turn is supported by an internally threaded cup 108 which is held on a threaded apron 109 depending from the bearing block 100.

Thus it is possible to adjust this shaft and its knives vertically by turning the hand wheel 105.

The description so far given is the normal construction of the Pollard machine disclosed in United States Patent 1,669,672.

My improvements relate to the novel arrangement for accomplishing the finishing cut and at the same time automatically straight lining the side breast edges of the blank.

The shaft 87 that was used on the Pollard machine as the finishing cutter head shaft is used as a pivotal point for my horizontal cutter head shaft 111. A yoke member 110 journals this shaft 111, and this shaft has a pulley 112 which is rotated by a belt 113 driven by an electric motor 114. This pulley 112 is of width and crown avoiding displacement of belt 113. On the shaft 111 I have shown a preferred type of cutter head 115 suitable for rotating on a horizontal axis. The yoke member 110 has adjustably mounted thereon a forwardly convex cam 116. A spring 117 connected to the frame and the yoke 110 resists turning of the yoke in clockwise direction, Figs. 2 and 14.

Each lag 31 carries at its advanced inner corner a cam lifter, indicated at 118 in the path of which the cam 116 is held by spring 117.

The machine is started by turning on the power whereupon the conveyor moves to the right, Figs. 1 and 2 and the cutting knives are rotated. The operator places a blank against the advanced side of the bunter on the lag with its forward edge against the guide plate 44. It is carried beneath the knife edge 61 of the pressure bar 60 of the first pressure block 63, and while held in position by the successive pressure bars it is first cut by the roughing cutter 86. The concave groove in the roughing cut extends straight along the breast of the blank.

While still held under the knife edge 61 and while carried by the lag the heel next comes into engagement with the finishing cutter 115 which, as noted, rotates on a horizontal axis. As the extension 118 of the lag engages the cam 116 the yoke 110 first rocks clockwise as illustrated in Figure 2 and then, upon further travel, the spring 117 returns the yoke counter clockwise to its original position, thereby causing the cutter to first make a deep cut, varying gradually to a shallower cut, and then gradually varying again to a deep cut in the heel. In Figure 5 a blank is shown lying on its side after having had the finishing cutting operation performed. It will be noted that while laterally the heel is concaved as indicated at 119, the longitudinal lines as indicated at 120 are slightly convex, to such a proper degree that when the heel is finished with the sides concaved the breast edges of the heel will be straight lined. The rocking of the yoke for this is not sufficient to cause belt 113 to leave pulley 112.

By varying the position of the lag extensions 118 and by varying the size and shape of the cam 116 on the yoke 110, the convexing of the breast of the heel can be accomplished with a desired curvature.

Having thus described my invention, what I claim is new and desire to secure by Letters Patent is:

1. In a heel grooving machine the combination of a conveyor a plurality of blank carriers thereon comprising lags with bunters, a roughing cutter into engagement with which blanks on said lags are carried, a finishing cutter, and means for varying the position of said finishing cutter along a line perpendicular to the surface which it cuts during the interval when a heel blank is being cut by said cutter.

2. In a heel grooving machine the combination of a conveyor, a plurality of blank carriers thereon comprising lags with bunters, a roughing cutter into engagement with which blanks on said lags are carried, a finishing cutter, and means for varying the position of said finishing cutter along a line perpendicular to the surface which it cuts during the interval when a heel blank is being cut by said cutter, while moving the heel in a straight path past said finishing cutter.

3. In a heel grooving machine the combination of a conveyor, a plurality of blank carriers thereon comprising lags with bunters, a roughing cutter into engagement with which blanks on said lags are carried, a finishing cutter, and means for varying the position of said finishing cutter during the interval when a heel blank is being cut, said finishing cutter being rotatable on a horizontal axis and having a mounting permitting pivotal movement on said mounting on a vertical axis.

4. In a heel grooving machine the combination of a conveyor, a plurality of blank carriers thereon comprising lags with bunters, a roughing cutter into engagement with which blanks on said lags are carried, a finishing cutter, means for varying the position of said finishing cutter during the interval when a heel blank is being cut, said finishing cutter being rotatable on a horizontal axis and having a mounting permitting pivotal movement of said mounting on a vertical axis, said means for varying the position of the finishing cutter comprising a cam on said mounting and cam engaging members on said lags.

5. A heel grooving machine having in combination a concaving cutter, means to advance a heel blank in a straight path into engagement with the cutter, and means to move the cutter to and from the path of movement of the blank along a line perpendicular to the surface which it cuts.

6. A heel grooving machine having in combination a concaving cutter, means to advance a heel blank in a straight path into engagement with the cutter, means to move the cutter to and from the path of movement of the blank along a line perpendicular to the surface which it cuts, said means being effective during intervals of engagement of said cutter and blank.

7. A heel grooving machine having in combination a concaving cutter, means to advance a heel blank in a straight path into engagement with the cutter, means to move the cutter from the path of movement of the blank, said means being effective during intervals of engagement of said cutter and blank, and said means comprising a cam and cam mover.

8. A woodworking tool comprising a concaving cutter, means for carrying wooden blanks continuously in sequence in a straight path into engagement with said cutter, said cutter being rotatable on an axis extending in the general direction of the blank movement, and means for swinging the cutter in a plane substantially parallel with said direction of movement.

9. A woodworking tool comprising a concaving cutter, means for carrying wooden blanks continuously in sequence in a straight path into engagement with said cutter, said cutter being rotatable on an axis extending in the general direction of the blank movement, and cam means for swinging the cutter in a plane substantially parallel with said direction of movement.

10. A woodworking tool comprising a concaving cutter, means for carrying wooden blanks continuously in sequence in a straight path into engagement with said cutter, said cutter being rotatable on an axis extending in the general direction of the blank movement, means for swinging the cutter in a plane substantially parallel with said direction of movement comprising a cam and cam mover, said cam mover being carried by said first noted blank carrying means.

11. A heel breast concaving machine comprising a concaving cutter, means for moving heel blanks in continuous sequence in a straight path into engagement with the cutter to cut the breast of the blank transversely concave, and means not affecting the path of movement of said heel blank carrying means for rendering the cut convex longitudinally of the breast of the blank during the concave cutting of said breast.

12. A heel breast concaving machine comprising a concaving cutter, means for moving heel blanks in continuous sequence in a straight path into engagement with the cutter to cut the breast of the blank transversely concave, and means not affecting the path of movement of said heel blank carrying means for rendering the cut convex longitudinally of the breast of the blank during the concave cutting of said breast, said concaving cutter being mounted on a horizontal rotatable shaft.

13. A heel breast concaving machine comprising a concaving cutter, means for moving heel blanks in continuous sequence in a straight path into engagement with the cutter, means not affecting the path of movement of said heel blank carrying means for straight lining the side breast edges of a blank during the concaving of the heel breast, said concaving cutter being mounted on a horizontal rotatable shaft, and said means for straight lining the side breast edges of a blank comprising a vetrically pivoted support for said shaft having a cam thereon.

14. A heel breast concaving machine comprising a concaving cutter, means for moving heel blanks in continuous sequence in a straight path into engagement with the cutter, means not affecting the path of movement of said heel blank carrying means for straight lining the side breast edges of a blank during the concaving of the heel breast, said concaving cutter being mounted on a horizontal rotatable shaft, and said means for straight lining the side breast edges of a blank comprising a vertically pivoted support for said shaft having a cam thereon, said blank moving means having cam movers engaging said cam during the concaving operation.

GEORGE CLAUSING.